(12) United States Patent
Wieczorek et al.

(10) Patent No.: US 8,869,870 B2
(45) Date of Patent: Oct. 28, 2014

(54) SUN SHADE MOTOR SPRING ASSEMBLY

(75) Inventors: Joseph P. Wieczorek, Lake Orion, MI (US); David L. Huff, Waterford, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 320 days.

(21) Appl. No.: 12/660,543

(22) Filed: Mar. 1, 2010

(65) Prior Publication Data
US 2011/0209837 A1  Sep. 1, 2011

(51) Int. Cl.
*B60J 3/00* (2006.01)

(52) U.S. Cl.
USPC .......................... 160/370.22; 160/31; 160/315

(58) Field of Classification Search
USPC ................... 160/370.22, 31, 314, 239, 323.1; 185/45
See application file for complete search history.

(56) References Cited

U.S. PATENT DOCUMENTS

| | | | |
|---|---|---|---|
| 1,567,095 A * | 12/1925 | Alasta | 160/301 |
| 1,866,788 A * | 7/1932 | Arthur | 160/275 |
| 2,517,270 A * | 8/1950 | Zimmerman | 160/72 |
| 2,806,244 A * | 9/1957 | Bernhard | 16/65 |
| 3,878,878 A * | 4/1975 | Reeder | 160/246 |
| 4,168,094 A | 9/1979 | Yagi | |
| 4,202,578 A | 5/1980 | Roullier | |
| 4,403,641 A | 9/1983 | Reeder | |
| 4,671,557 A | 6/1987 | Lemp | |
| 4,923,244 A | 5/1990 | Clenet | |
| 4,925,238 A | 5/1990 | Thaler | |
| 4,932,704 A | 6/1990 | Ament | |
| 5,031,682 A | 7/1991 | Tedeschi | |
| 5,226,467 A * | 7/1993 | Lii | 160/302 |
| 5,314,053 A | 5/1994 | Nishimura | |
| 5,464,052 A | 11/1995 | Wieczorek et al. | |
| 5,934,354 A | 8/1999 | Price et al. | |
| 6,155,636 A | 12/2000 | Stehning et al. | |
| 6,386,626 B1 | 5/2002 | Makino et al. | |
| 6,508,507 B2 | 1/2003 | Raasakka | |
| 6,520,239 B2 | 2/2003 | Schlect et al. | |
| 6,536,829 B2 | 3/2003 | Schlecht et al. | |
| 6,546,990 B2 | 4/2003 | Peeters | |
| 6,634,703 B1 | 10/2003 | De Gaillard | |
| 6,676,205 B2 | 1/2004 | Lin | |
| 6,682,133 B2 | 1/2004 | Glasl | |
| 6,691,965 B1 | 2/2004 | Lin | |
| 6,701,994 B2 * | 3/2004 | Goldenberg et al. | 160/31 |
| 6,715,525 B2 | 4/2004 | Ehrenberger et al. | |
| 6,729,074 B1 | 5/2004 | Huisman et al. | |
| 6,904,608 B2 | 6/2005 | Jeong et al. | |
| 6,923,500 B2 | 8/2005 | Ito | |
| 6,957,850 B2 | 10/2005 | Breuer et al. | |
| 7,029,061 B2 | 4/2006 | Lin | |
| 7,204,548 B2 | 4/2007 | Wilms et al. | |

(Continued)

*Primary Examiner* — Blair M. Johnson
(74) *Attorney, Agent, or Firm* — Raggio & Dinnin, P.C.

(57) ABSTRACT

A motor spring assembly for use in a sun shade assembly in a vehicle comprises a motor spring housing and a bracket integral with and extending from the housing. The assembly also comprises a cover arranged over one side of the housing and a motor spring arranged within the housing. The assembly further comprises a shaft in contact with the motor spring wherein the shaft rotates with respect to the housing. The assembly also includes a connector arranged over an end of the shaft. The motor spring assembly generally will be arranged and secured within a guide rail of a sun shade assembly thus allowing for a more robust and durable sun shade assembly within an automotive vehicle.

23 Claims, 7 Drawing Sheets

(56) References Cited

U.S. PATENT DOCUMENTS

| | | |
|---|---|---|
| 7,287,811 B2 | 10/2007 | Sanders et al. |
| 7,370,685 B2 * | 5/2008 | Moriya et al. ............. 160/290.1 |
| 7,413,000 B2 | 8/2008 | Lin |
| 7,445,276 B2 | 11/2008 | Gonzalez Merino et al. |
| 7,469,960 B2 | 12/2008 | Koelbl et al. |
| 7,503,374 B2 | 3/2009 | Takeuchi et al. |
| 7,568,752 B1 | 8/2009 | Lin |
| 7,694,712 B2 * | 4/2010 | Schimko et al. ............. 160/315 |
| 7,874,343 B2 * | 1/2011 | Hansen .................... 160/370.22 |
| 8,302,655 B2 * | 11/2012 | Lin ............................... 160/315 |
| 8,307,879 B2 * | 11/2012 | Lin ............................... 160/314 |
| 2002/0195843 A1 | 12/2002 | Glasl |
| 2005/0236117 A1 | 10/2005 | Lin |
| 2005/0257903 A1 | 11/2005 | Schimko et al. |
| 2007/0175603 A1 | 8/2007 | Lin |
| 2007/0267898 A1 | 11/2007 | Lin |
| 2008/0006373 A1 | 1/2008 | Lin |
| 2008/0142172 A1 | 6/2008 | Hansen et al. |
| 2011/0209837 A1 * | 9/2011 | Wieczorek et al. ........... 160/314 |

* cited by examiner

SUN SHADE MOTOR SPRING ASSEMBLY

FIELD OF THE INVENTION

The present invention generally relates to a sun shade assembly for a vehicle and more particularly relates to a sun shade motor spring assembly having a combination motor spring housing and bracket that is retained within a guide rail of a sun shade assembly for use within a vehicle.

DESCRIPTION OF RELATED ART

Sun shades for use in automobiles for shielding an interior of the automotive vehicle from sun light are well known in the art. A sun shade device for shading an automotive sun roof is also known in the art. Many of the prior art sun shade devices generally are aligned in the interior of the vehicle adjacent to the window or panel mounted in the roof or other parts of the vehicle. These prior art systems usually have a screen which is extendable along a flat horizontal plane which is disposed immediately beneath the roof window for blocking sunlight when deployed. It should be noted that in recent years there has been a trend in making the automobile sun roof slightly curved in a left and right direction. The above described prior art sun shade device forms a large clearance within the interior of the automobile, thus creating a relatively poor light blocking effect. It should be further noted that because of the large window areas in many of today modern vehicles, considerable heat is generated in the interior of the vehicle which results in considerable amounts of energy needed to counteract the heating effects on the vehicle. Therefore, many of these motor vehicles are increasingly equipped with window shades over regular windows in the vehicle or sun roof. Generally, it is well known in the art to attach two guide rails parallel and adjacent to a window in which the window shade is used. The length of the shade may be adjustable in order to accommodate various window widths and lengths. Actuation of the prior art shades may take place by means of either a thrust member running in a guide rail or some other type of moving mechanism. Many of these prior art sun shades are arranged adjacent to a sun roof in an automobile and are supported in the roof in a slidably forward and rearward direction, this allows both side portions of the sun shade guide rails to cover an opening formed in the ceiling panel. Many prior art sun shades are difficult to deform and have a high rigidity, therefore it has been difficult to reduce the weight and manufacturing costs of the prior art sun shades.

The complexity of many of the prior art sun roof shade assemblies increases costs because of weight and the time needed to install the assemblies within the interior of the vehicles. Furthermore, the customers want an aesthetically pleasing look to the sun shades along with an easy to operate sun shade within the vehicle. Therefore, there is a need in the art for a sun shade assembly that is easy to install, lighter in weight and more durable than sun shade assemblies of the prior art. Furthermore, there is a need in the art for an improved motor spring assembly for use on each side of a sun shade that is deployed over a sun roof of an automotive vehicle. Also, there is a need in the art for a motor spring assembly that incorporates a motor spring housing and bracket into one integral, unilateral unit ensuring easy installation and more durable components for a sun shade assembly for use in automotive vehicles. There also is a need in the art for an easier to install, more robust sun roof shade assembly that uses a motor spring instead of a torsion spring to operate the shade.

SUMMARY OF THE INVENTION

One object of the present invention may be to provide an improved sun shade assembly.

Another object of the present invention may be to provide an improved motor spring assembly for use with a sun shade assembly.

Still another object of the present invention may be to provide a motor spring assembly that includes a motor spring housing/bracket integrated into one device that is a unilateral integral unit. One part replaces what used to take two or three parts to accomplish within the automotive environment.

Yet a further object of the present invention may be to provide a housing cover that is arranged over the motor spring housing to ensure the motor spring stays secured within the motor spring housing.

Still another object of the present invention may be to provide a shaft that has flat surfaces arranged near one end thereof.

Still another object of the present invention may be to provide a bearing that may have a living hinge which will allow it to clamp around a shaft having flat surfaces for anti slip between the shaft and the bearing.

Still another object of the present invention may be to provide the bearing arranged within a roll tube wherein a tongue or raised surface on the bearing interacts with a groove on the roll tube to ensure the roll tube and bearing rotate with one another.

Yet a further object of the present invention may be to provide a motor housing that has a plurality of locking tabs extending therefrom and which interacts with a plurality of locking fingers that extend from the cover of the motor spring assembly.

Yet a further object of the present invention may be to provide a motor spring housing that incorporates a generally circumferential pocket extending from a side thereof, wherein the circumferential pocket receives one end of a shaft therein to help support the shaft within the sun shade assembly.

Another object of the present invention may be to provide a bracket with an orifice therethrough such that the orifice may be used to receive a locking tab or fastener to secure the bracket to a guide rail within a sun shade assembly.

Still another object of the present invention may be provide a sun shade assembly that is easier to manufacture and assemble than other sun shade assemblies in the prior art thus reducing overall costs and time needed to manufacture the sun shade assembly.

Still another object of the present invention may be that it provides for a more robust connection between the motor spring assemblies, the roll tube and shade to the guide rail into which it is arranged by having the motor spring housing directly arranged within the guide rails thus creating a more robust connection capable of more cycles than prior art sun shade assemblies.

According to the present invention, the foregoing and other objects and advantages are obtained by a novel design for a motor spring assembly for use in a sun shade assembly in a vehicle. The motor spring assembly comprises a motor spring housing and a bracket integral with and extending from the housing. The housing also includes a cover arranged over one side of the housing and a motor spring arranged within the housing. The motor spring assembly further includes a shaft in contact with the motor spring wherein the shaft rotates with respect to the housing. The motor spring assembly also includes a connector or bearing arranged over one end of the shaft.

One advantage of the present invention may be that it provides for a new and novel motor spring assembly for use with a sun shade assembly.

A further advantage of the present invention may be that it provides for a sun shade assembly that uses a motor spring assembly that is arranged directly within the guide rails of the sun shade assembly.

Still a further object of the present invention may be that it provides for a motor spring assembly that incorporates both the housing and a bracket within one unilateral integral unit, thus reducing generally two or three parts in the prior art to one part.

Yet a further advantage of the present invention may be that it provides a motor spring assembly that includes a housing with a plurality of locking tabs extending from an outer surface thereof.

Still a further object of the present invention may be that it provides for a motor spring assembly that includes a circumferential pocket extending from one side of the housing wherein that pocket receives and helps to support a shaft therein.

Still a further advantage of the present invention may be that it provides for a cover that includes a plurality of locking fingers extending therefrom wherein those locking fingers interact with locking tabs on a housing to secure a motor spring within a motor spring housing.

Yet a further advantage of the present invention may be that it provides a shaft that includes a slit along a mid point thereof for interacting with the motor spring and flat surfaces arranged on one end thereof wherein those flat surfaces are arranged within a bearing.

Still a further advantage of the present invention may be that it provides a motor spring assembly that includes a bearing that includes a living hinge or other locking mechanism that interacts with the flat surfaces on a shaft to ensure the shaft and bearing rotate with one another.

Yet another advantage of the present invention may be that it provides a sun shade assembly that is easier to assemble, weighs less and is easier to install within the vehicle environment.

Still another advantage of the present invention may be that it provides for a motor spring assembly for use in a sun shade assembly that is more robust and capable of more cycles than those of prior art sun shade assemblies.

Yet another advantage of the present invention may be that it provides for use of a motor spring in a shade for a sun roof assembly versus the more commonly used torsion spring assemblies known in the prior art.

Other objects, features and advantages of the present invention will become apparent from the subsequent description and appended claims, taken in conjunction with the accompanying drawings.

BRIEF DESCRIPTION OF THE PREFERRED EMBODIMENT(S)

Figure 1:
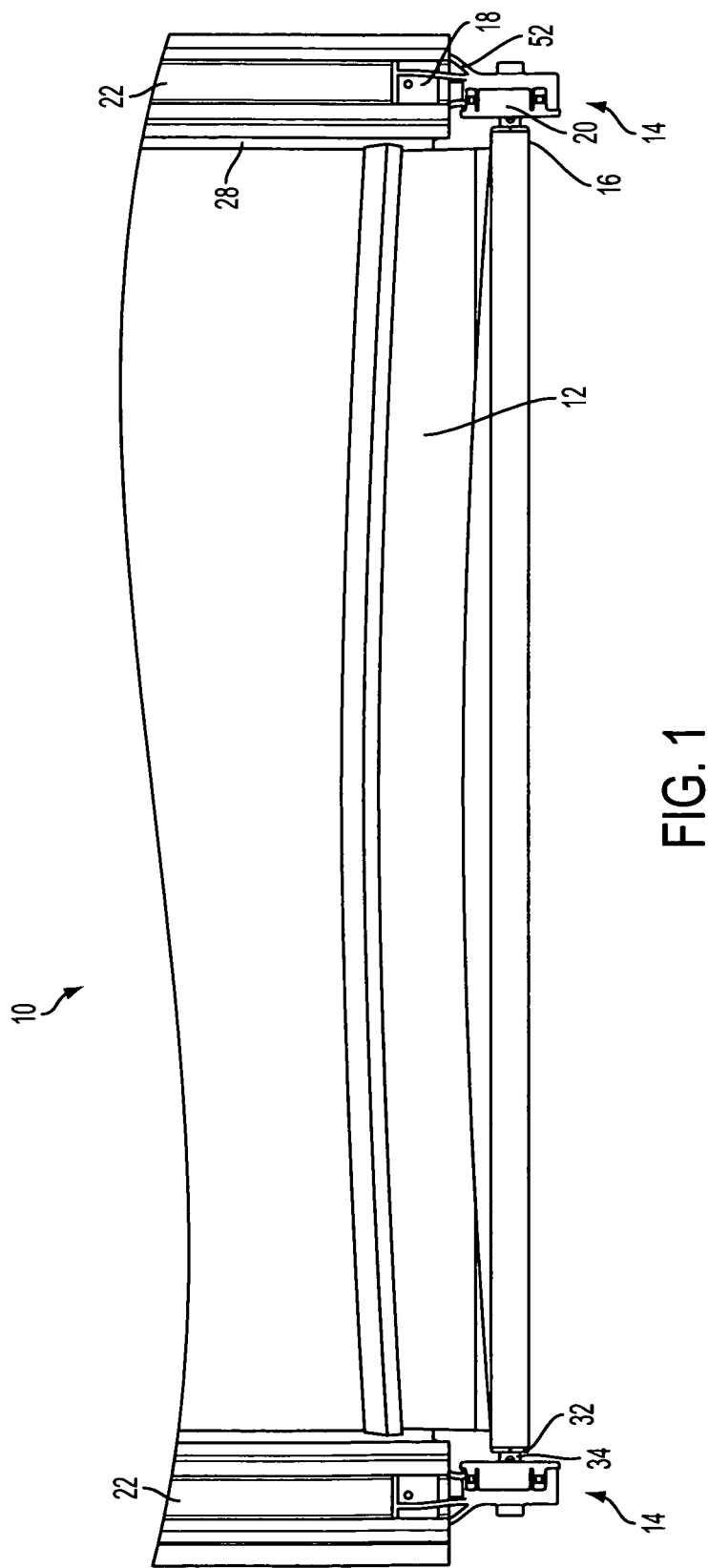
FIG. 1 shows a sun shade assembly for a vehicle according to the present invention.
Figure 2:
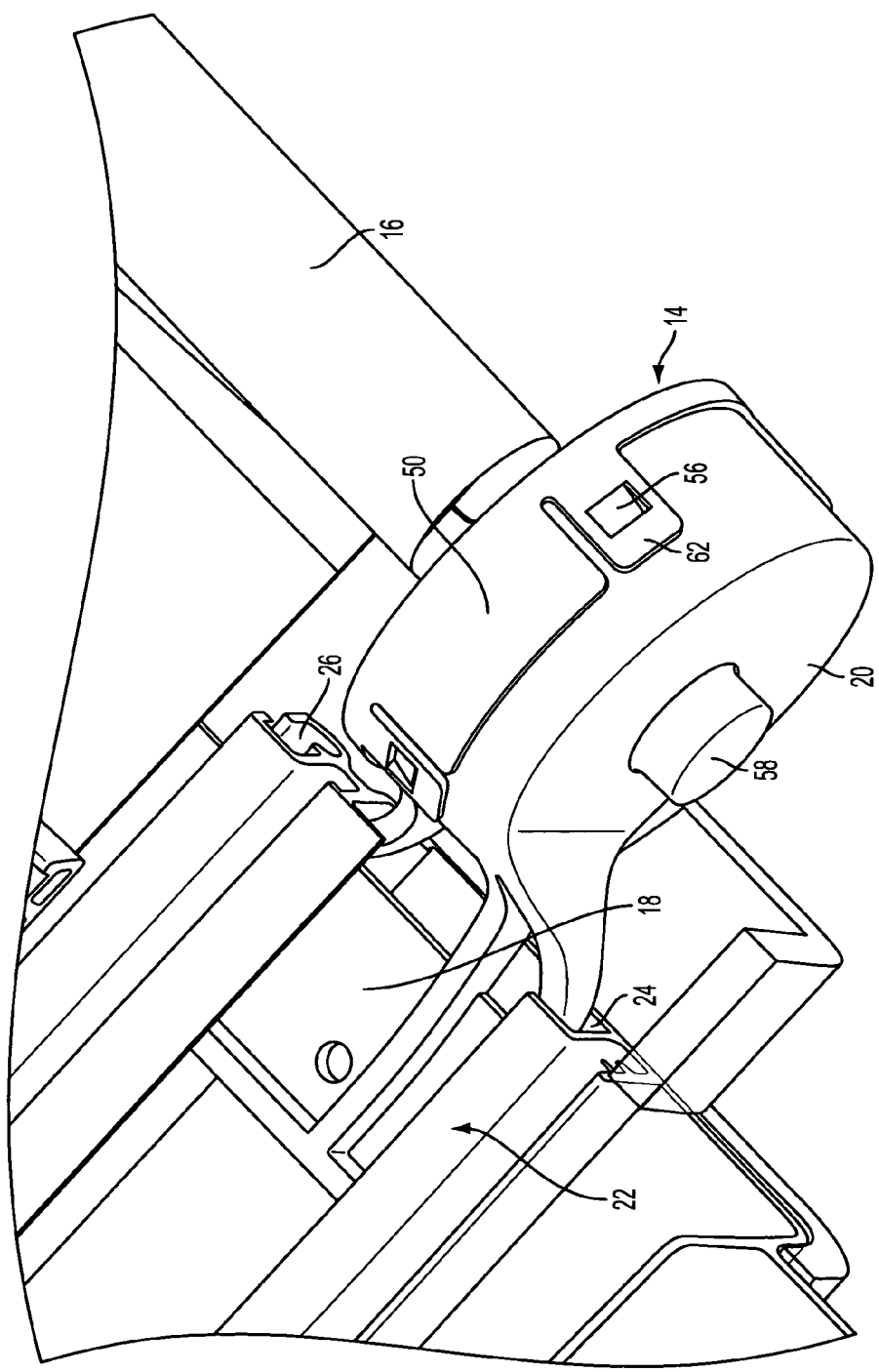
FIG. 2 shows a close up view of a motor spring assembly according to the present invention.
Figure 3:
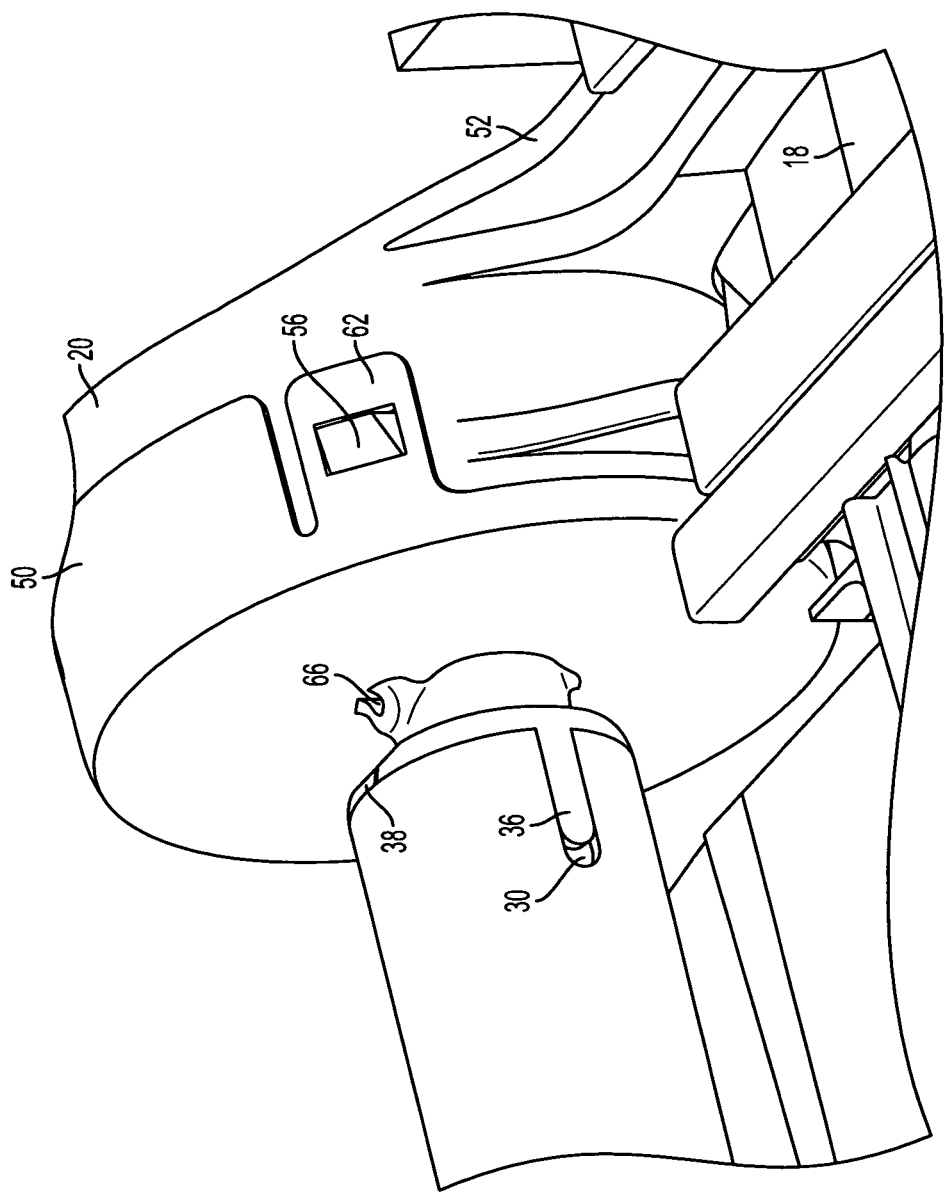
FIG. 3 shows a plan view of a motor spring assembly according to the present invention.
Figure 4:
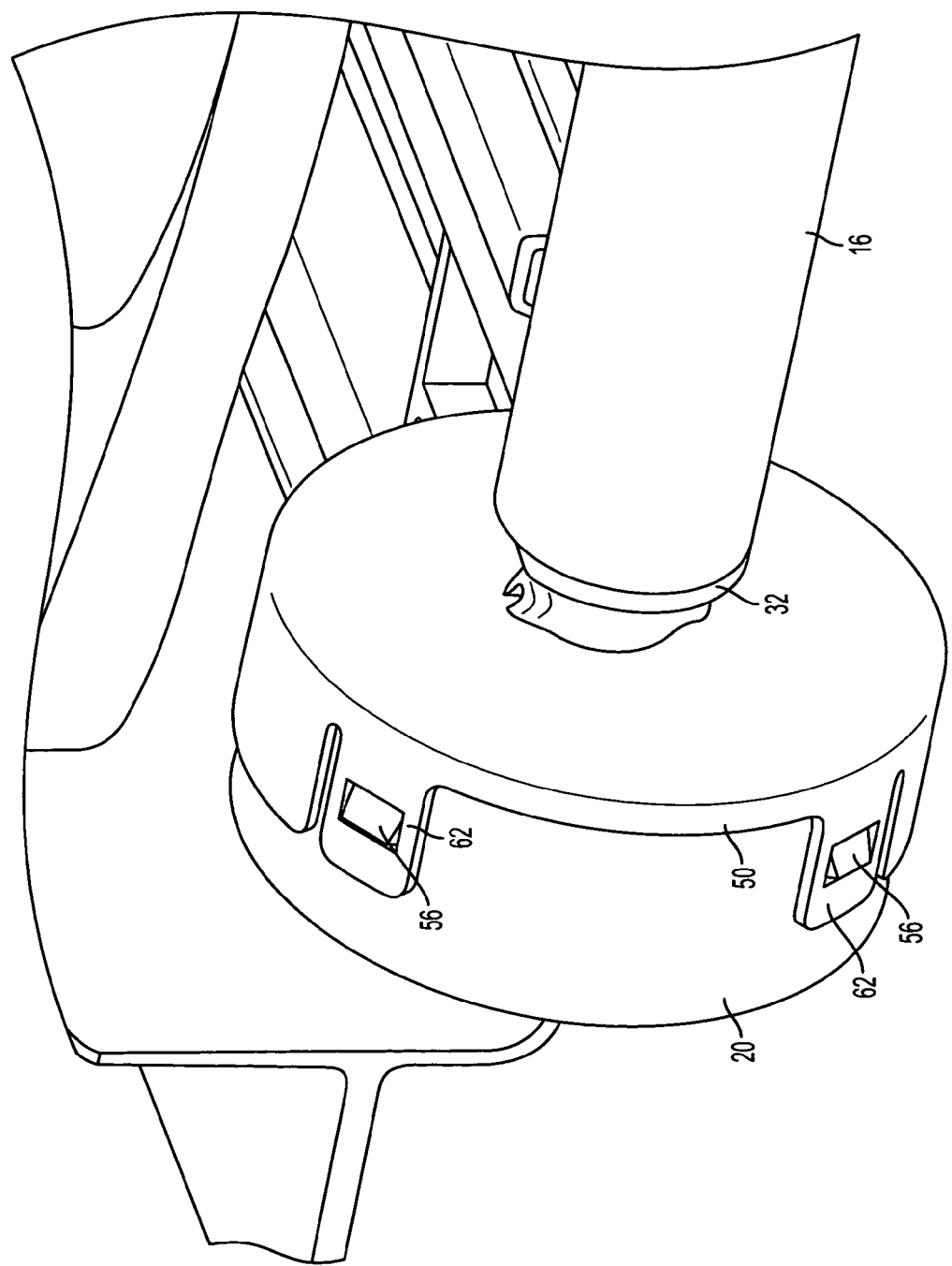
FIG. 4 shows a back view of a motor spring assembly according to the present invention.
Figure 5:
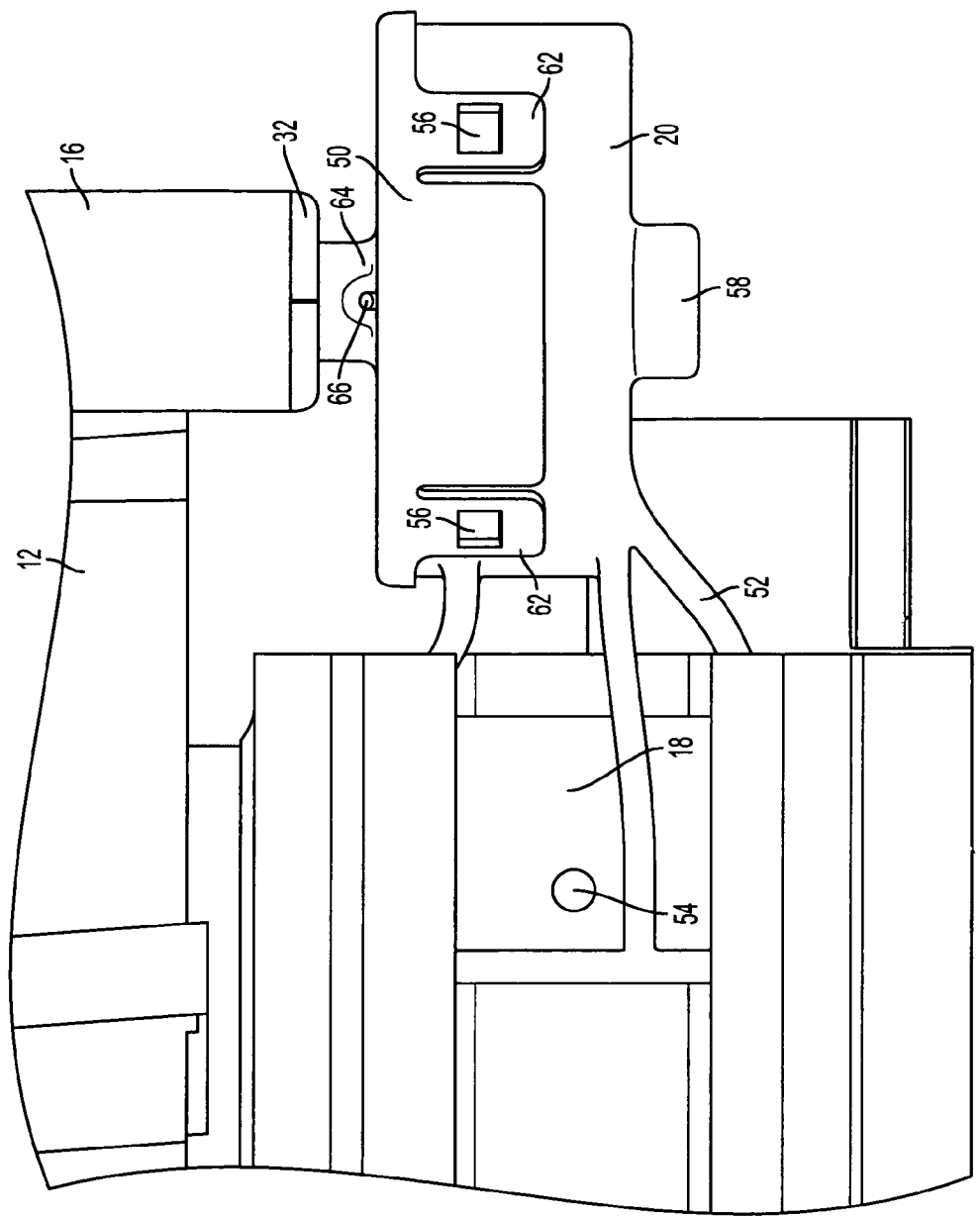
FIG. 5 shows a top view of a motor spring assembly installed within a sun shade assembly according to the present invention.
Figure 6:
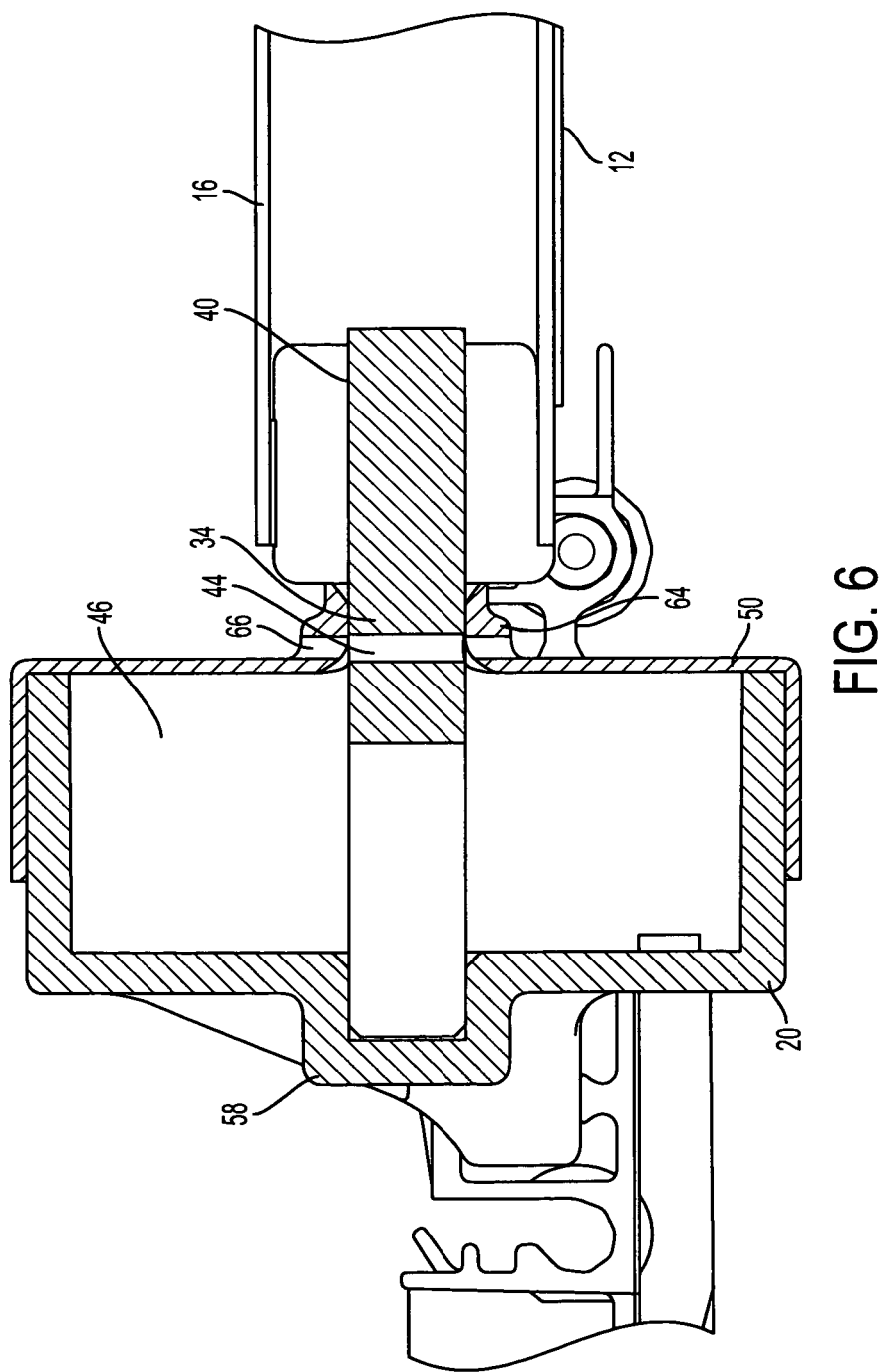
FIG. 6 shows a cross sectional view of a motor spring assembly according to the present invention.

Referring to the drawings, there is shown a sun shade assembly 10 according to an embodiment of the present invention. Generally, the present invention broadly provides a sun shade assembly for use in a vehicle. The sun shade assembly 10 may be used to provide protection from the sun from penetrating the interior of the vehicle from any window or from a sun roof in the roof of the vehicle. The sun shade assembly 10 shown in FIG. 1 generally is one that is used with a sun roof of a vehicle. A sun shade 12 may be deployed when intense sunlight or any sunlight penetrates the interior through the sun roof thus creating uncomfortable temperatures within the interior of the vehicle. The use of the sun shade 12 may allow for the sun to be blocked from entering the vehicle interior. It should be noted that the sun shade assembly 10, according to the present invention, may also be used on any type of shade used for blocking the sun from entering any of the other windows of a vehicle. It should also be noted that automotive vehicles are contemplated generally for use of the sun shade assembly 10, however any other vehicle, such as but not limited to marine, aeronautical, space, or any other known vehicle may be used in conjunction with the present invention.

The sun shade assembly 10 of the present invention includes an improved motor spring assembly 14 which may be arranged on each end of a roller or roll tube 16 of the sun shade assembly 10. However, it is contemplated to use only one motor spring assembly 14 on one end of the roll tube 16 and another type of end mechanism on the opposite end. The motor spring assembly 14 unifies and integrates a bracket 18 into a motor spring housing 20 in one integral unit. Generally, in the prior art two or three separate pieces would have to be installed and connected to one another to perform the operations of the motor spring housing bracket of the present invention. Furthermore, many of the parts of the motor spring assembly 14 are made of a plastic material, which will reduce weight and overall costs to the automobile manufacturer. However, it should be noted that any other type of material, including but not limited to metals, ceramics, composites, natural materials or any other known material may be used for any of the part described herein, not just those mentioned as being the preferred material for any of the parts described hereunder. The use of the integral bracket motor spring housing may offer easier installation by workers into the automotive vehicle. It is contemplated to have the motor spring assembly 14 with the roll tube 16 arranged therebetween inserted into the sun shade assembly 10 prior to the sun shade assembly 10 being secured within the interior roof of the vehicle, however it is also possible and contemplated to install the motor spring assemblies 14 within the sun shade assembly 10 after the sun shade assembly 16 guide rails and the like are installed within the vehicle.

In the embodiment shown in FIGS. 1 through 7, the sun shade assembly 10 generally includes a first and second guide rail 22, wherein the guide rails 22 have a predetermined length and width and may extend generally the entire length of the window to which the sun shade 12 is being arranged thereover. Generally in the vehicle, the guide rails 22 are parallel to one another and align within in the vehicle such that the sun shade 12 covers a sun roof from a rearward to a forward direction with respect to the vehicle. However, it should be noted that the sun shade 12 can also cover from a forward to a rearward direction of the vehicle depending on the design requirements. It should further be noted that it is also contemplated to arrange the guide rails 22 such that the sun shade 12 is deployed and stored in a side to side direction with respect to the vehicle. The guide rails 22 are made of a metal material, however any other material may also be used. The guide rails 22 may include at least one generally U-shaped channel 24, wherein the U-shaped channel 24 also may include two C-shaped members, as shown in the figures. The guide rail 22 also may include a second generally shaped U-shaped channel 26 adjacent to the main channel 24 in which a guide member 28 attached to the shade 12 may be arranged therein thus allowing for automatic deployment and storage of the sun shade 12. Generally, a cord or other type of moving mechanism is attached to one end of the sun shade 12 and will allow for a motor to rotate the cord and move the cord in a predetermined direction. The rotation in the predetermined direction will allow for deployment of the sun shade 12 or storage of the sun shade 12 depending on the switch and electronics involved therein. The guide rail 22 may also include a plurality of other channels for holding other devices therein and for connecting to either the roof of the vehicle or the side surfaces of the vehicle adjacent to windows and the like. It is contemplated to install the guide rails 22 as separate units or to install a guide rail system that may be formed out of plastic, metal or any other known material wherein the system, which includes both of the guide rails 22 parallel and spaced apart from one another a predetermined distance, directly into the vehicle roof. It should be noted that the sun shade assembly 10 may also engaged with the guide rails 22. A sun panel, which generally is made of a glass material, is either tilted up or moved to allow for open air enjoyment by the users of the vehicle. Another set of moving mechanisms such as a cord or the like and the necessary motors may be arranged adjacent to or near the guide rails 22 to allow for movement of the sun roof window separately from that of the sun shade 12 as described herein.

The sun shade assembly 10 also may include a shade 12 which generally has a shape that mimics that of the window that is being covered. Therefore, any known shape can be used for the sun shade 12, generally it is a rectangular shape that covers that of the window or may be more of a square like shape or any other known shape depending on the window being covered. One end of the shade 12 is secured to a roll tube or roller tube 16. Any known fastening technique, such as but not limited to gluing, tacking, using fasteners or any other known chemical fastening technique or mechanical fastening technique may be used to secure one end of the sun shade 12 to the roll tube 16. The opposite end of the shade 12 may have some type of edge member 28 arranged thereon wherein each end of the edge member 28 may have a bracket secured thereto wherein that bracket is arranged within one of the channels of the guide rail 22. The bracket then may have a cord connected thereto which will allow for movement of the sun screen shade 12 to a predetermined position to cover the sun roof or other window within the vehicle. The edge member 28 also may provide more rigidity and less flex to the sun shade 12. It should be noted that any known material can be used for the sun shade 12, preferably one that would provide for blockage of the sun in a manner in which a clean appearance occurs for the user of the vehicle therein. Some shades 12 may include a fabric over a cardboard type material or any other plastic material that may stiffen the shade 12 when in a deployed position, but still allow for the shade 12 to be rolled onto the roll tube 16 during storage of the sun shade 12. It should be noted that the sun shade 12 generally may extend the entire distance located between the pair of guide rails 22 within the roof of the vehicle.

The roll tube 16 generally may be approximately the width of the sun shade 12, however in the embodiment shown the roll tube 16 is generally a predetermined distance longer than the width of the sun shade 12. The roll tube 16 in the present invention may be made of an aluminum material, however any other metal, plastic, composite, ceramic or natural material may be used for the roll tube 16. It should be noted that the roll tube 16 may be hollow or solid. Each end of the roll tube 16 may also include a slot 30 that extends a predetermined distance and will be used to receive a connector or bearing 32 therein in order to secure the connector 32 rotatably to the roll tube 16.

The sun shade set assembly 10 also includes a connector 32 which generally is arranged on each end of a shaft. The connector 32 may include a raised surface or tongue 36 that extends from an outer surface thereof. This raised surface or tongue 36 generally extends a predetermined distance that generally matches that of the slot 30 which extends a predetermined distance from an end of the roll tube 16. The connector 32 generally may have a hollow cylindrical like bore through the mid point thereof. In one contemplated embodiment the connector 32 may have a living hinge therein that is capable of allowing it to clamp around a shaft 34 that is used within the motor spring assembly 14. However, it is also contemplated to have the connector 32 with an orifice through an entire diameter thereof wherein a fastener or other device may be used to secure the connector 32 to the shaft 34 to ensure the shaft 34 rotates with the connector 32 and the roll tube 16. It is also contemplated to use a fastener or other device to secure the connector 32 to the roll tube 16 to ensure the connector 32 rotates with the roll tube 16. In the present invention during assembly the tongue 36 is aligned with the slot 30 on each end of the roll tube 16 and the connector 32 is inserted into each end of the roll tube 16 such that a predetermined lip 38 that extends from one end of the connector 32 comes in contact with the end of the roll tube 16. The tongue 36 will then engage with the slot 30 of the roll tube 16 thus ensuring the connector 32 and roll tube 16 are rotatably fixed with respect to one another. The lip 38 may have any known shape. The connector 32 generally has a circular or cylindrical shape to generally match that of the roll tube diameter. The outer diameter of the roll tube 16 generally may be equal to or a little less than the outer diameter of the connector 32 thus ensuring for an interference fit between the connector 32 and the roll tube 16. However, any other method of securing the connector 32 to the roll tube 16 including but not limited to gluing, fasteners or any other known mechanical fastening or chemical fastening technique may also be used. In the embodiment described herein, the connector 32 is pressed into the roll tube 16 with a press fit wherein the tongue 36 interacts with the slot 30 on the end of the roll tube 16. thus allowing for the connector 32 to rotate with the roll tube 16. This will ensure that the connector 32, the roll tube and shaft act as one rotatable unit. Generally, the connector 32 is made of a hard rubber material, however any other metal, ceramic, plastic, composite or natural material may be used for the connector 32.

Figure 7:
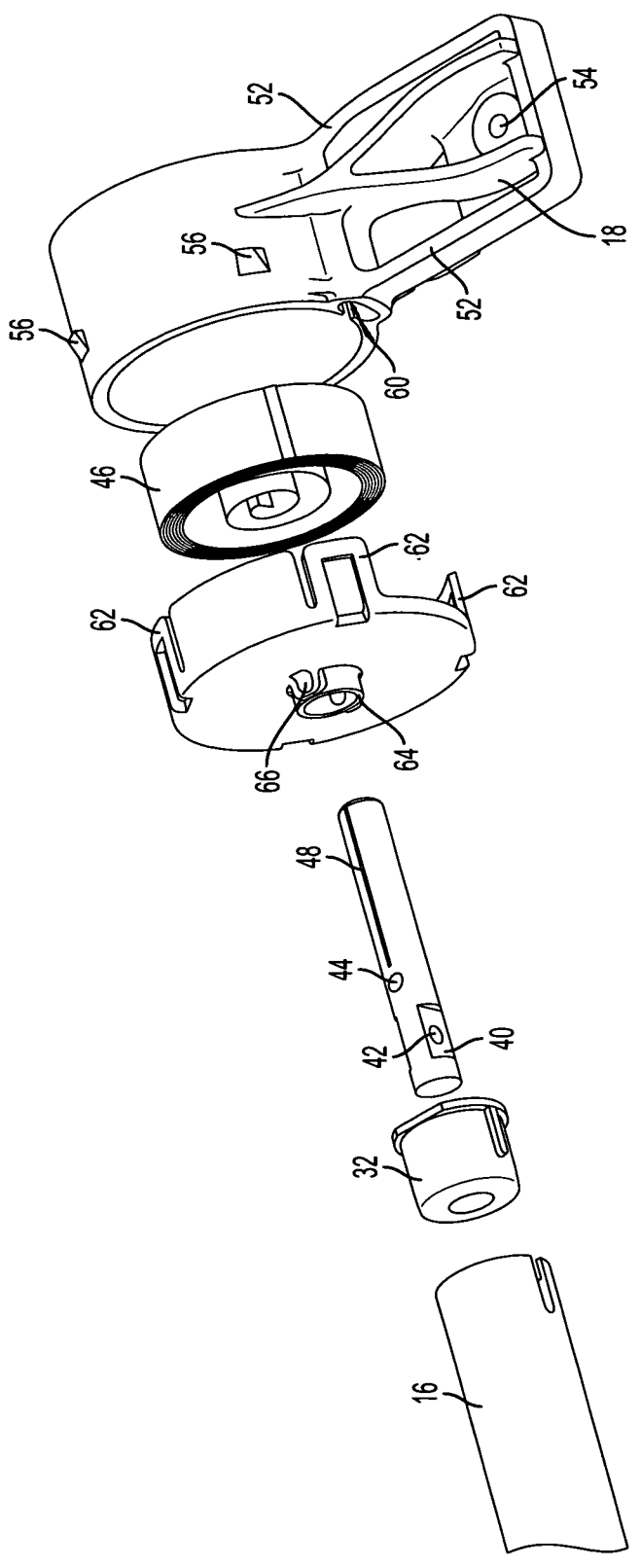
FIG. 7 shows an exploded view of a motor spring assembly according to the present invention.

The sun shade assembly 10 also may include a shaft 34 which generally has a cylindrical shape. The shaft 34 is generally a solid cylinder shape and is made of a steel material in one contemplated embodiment. However, it should be noted that any other metal, ceramic, plastic, composite or natural material may also be used for the shaft 34 depending on the design requirements of the sun shade assembly 10. The shaft 34 has a predetermined length and diameter. One end of the shaft 34 may include at least one flat surface 40 that extends on the outer surface of the shaft 34 either from the end of the shaft 34 a predetermined distance or the flat surface 40 is a predetermined distance from the end of the shaft 34 and extends for a predetermined distance as shown in FIG. 7. An orifice 42 or cavity may be placed through the flat surface 40 to ensure rotation of the connector 32 and roll tube 16 are fixed to one another. The shaft 34 also may include another orifice 44 arranged through the diameter thereof. This orifice 44 is used to preset the motor spring 46 within the motor spring assembly 14. One embodiment of the shaft 34 may also include a slot 48 that extends along a mid point thereof from the second end of the shaft 34. The slot 48 extends a predetermined distance into the shaft 34. In one contemplated embodiment the slot 48 may extend greater than one half of the entire length of the shaft 34. This slot 48 may be used to accept and hold one end of the motor spring 46 within the motor spring housing 20. The end of the shaft 34 that has the flat surfaces is arranged within the connector 32 and the flat surfaces engage with a living hinge on the inner surface of the connector 32 which allows the connector 32 to clamp around the shaft flat 40, thus allowing for anti slip between the shaft 34 and connector 32 and in turn the roll tube 16. Thus, the shaft 34 will rotate with the roll tube 16 and connector 32 in the present invention.

The sun shade assembly 10 also includes a motor spring assembly 14. The motor spring assembly 14 includes a housing 20, a motor spring 46 arranged within the housing 20 and a cover 50 arranged over one side of the housing 20 to ensure the motor spring 46 remains properly placed within the motor spring housing 20.

In the present invention the motor spring housing 20 generally has a cup like shape. The motor spring housing 20 is attached to a bracket 18 via at least one arm 52. In the embodiment shown a plurality of arms 52 are arranged between an outer surface of the motor spring housing 20 and the bracket 18. It should be noted that the motor spring housing/bracket is one unit that integrates both the bracket 18 and the motor spring housing 20 into a compact unit that allows for the integration of at least two or three parts from the prior art into one part in the present invention. The bracket 18 generally has a rectangular shape and generally includes an orifice 54 through a surface thereof. This orifice 54 may be used to receive either a fastener or locking tab from the guide rail 22 which will ensure the motor spring housing 20 is aligned and secured in a predetermined position with respect to the sun roof in which the sun shade 12 will be deployed and stored thereover. It is also contemplated that an interference fit may be used and built into the bracket 18 via angled surfaces or the like in order to remove the need for a fastener or locking tab from the guide rail 22 to be used to secure the motor spring housing/bracket in its proper position with respect to the guide rails 22. It should be noted that the bracket 18 of the motor spring housing 20 generally has as width that is equal to that of the width of one of the channels 24 of the guide rail 22. This will allow for the motor spring assembly 14 to be slid into each guide rail 22 on an end thereof and properly align the roll tube 16 and shade 12 to the window that is being covered. As shown in the figures a plurality of arms 52 may be formed or molded between the motor spring housing 20 and the bracket 18. The design for these can be any known design such as that shown in FIG. 7 or such as that shown in FIGS. 1 through 6. Generally, the motor spring housing bracket unit will be molded of a plastic material, however it is also contemplated to machine it, extrude it or use any other forming technique available for any known material. It should also be noted that any other material such as metal, ceramics, plastics, composites, or natural material may be used for the motor spring housing 20 and bracket 18. Arranged on an outer surface of the motor spring housing 20 are a plurality of locking tabs 56. In the embodiment shown four locking tabs 56 are spaced at predetermined distances around the outer circumference of the motor spring housing 20. It should be noted that fewer or more locking tabs 56 may also be used depending on the design requirements of the sun shade assembly 10. The motor spring housing 20 may also include a generally circumferential pocket 58 extending from one side of the motor spring housing 20. This circumferential pocket 58 generally is arranged at a mid point thereof on the motor spring housing 20. The circumferential pocket 58 may receive and hold one end of the shaft 34 to help support the shaft 34 along the mid point of the roll tube 16 to ensure for proper winding and unwinding of the shade 12 from the roll tube 16. The use of the pocket 58 may help create a rattle free and wobble free winding and unwinding of the shade 12 over the window. It should be noted that it is contemplated not to have the circumferential pocket extending from the side of the motor spring housing 20 according to the present invention. The motor spring housing 20 also may include on an inner surface thereof a locking shoulder or notch 60 arranged at a predetermined position. This locking shoulder or notch 60 may be used to receive one end of the motor spring 46 when the motor spring 46 is arranged therein.

The motor spring assembly 14 also includes a motor spring 46 arranged within the housing 20 of the motor spring assembly 14. The motor spring 46 generally is a coiled spring made of a metal material. However, it should be noted that the motor spring 46 may be made of any known ceramic, plastic, composite, metal or natural material capable of having a predetermined spring co-efficient built therein. One end of the motor spring 46 may be arranged within or engaged and in contact with the locking shoulder or locking notch 60 on the inner surface of the motor spring housing 20. This end generally is the outer end of the motor spring 46. The other end of the motor spring 46 is generally arranged at or near a mid point of the motor spring housing 20 and may be arranged within the slot 48 of the shaft 34. This interaction between the slot 48 on the shaft 34 and the notch 60 on the inner surface of the housing 20 will allow for the motor spring 46 to coil up and store energy and then allow for the uncoiling of the spring 46 within the motor spring housing 20 to release the energy and move the sun shade 12 in a smooth, consistent manner during rolling or unrolling of the shade 12 from the roll tube 16.

The motor spring assembly 14 also includes a cover 50 arranged over the open side of the motor spring housing 20. Generally, the cover 50 has a cup like shape and generally includes a disc like portion with a wall extending generally around the entire circumference of the disc. Predetermined portions of the wall are removed to allow for proper positioning over the bracket 18 of the motor spring housing unit 20. Generally, the cover 50 also includes a plurality of locking fingers 62 arranged at predetermined positions of the cover 50. These locking fingers 62 align with and mate with the locking tabs 56 on the outer surface of the motor spring housing 20. Generally, these locking fingers 62 have a rectangular shape with a rectangular orifice through the middle of the locking fingers 62. The rectangular orifices are arranged over the locking tabs 56 such that a locking surface of the locking tabs 56 engage a locking surface of the locking fingers 62 thus securing the motor spring 46, correctly aligned, within the housing 20 via the cover 50. The cover 50 also may include generally at a mid point thereof a cylindrical member or lip 64 extending a predetermined distance from the outer surface of the cover 50. The cylindrical member 64 generally is hollow and has an inner diameter that matches that of the outer diameter of the shaft 34. It should be noted that generally a predetermined sized orifice 66 may pass through the entire outer diameter of the cylindrical member 64. The diameter of this orifice 66 generally matches the diameter of the orifice 44 through the shaft 34. The cylindrical member 64 extending from generally a mid point of the cover may allow for more support of the shaft 34 with relation to the connector 32 and the housing 20. The orifice through both surfaces of the cylindrical member 64 will allow for a pin or other type of fastener or device to be deployed through the orifice of the cover 50 and the orifice of the shaft 34 during preassembly of the sun shade assembly 10t. During installation of the motor spring 46 within the motor spring housing 20 the motor spring 46 may or may not be prewound and maintained at a predetermined force by the pin that extends through the orifice or aperture of the housing cover and the orifice 44 of the shaft 34. This thereby prevents relative rotation between the motor spring housing 20 and the roll tube 16 during installation thereof. After insertion of the motor spring housing brackets 18 into the guide rails 22 of the sun shade assembly 10 the pins or other fasteners will be removed from each of the motor spring assemblies 14 thus allowing for the motor spring 46 to operate in its predetermined manner with its prewound motor spring 46 set up for optimal performance. Generally, in the invention described herein, the motor spring assembly 14 may start at the high range of the motor spring 46 and stay there to allow for smooth deployment and retrieval of the sun shade 12 within the vehicle. It should be noted that generally the cover 50 is made of a plastic material that is the same as that of the motor spring housing 10, however any other plastic, ceramic, composite, metal or natural material may also be used for the cover 50. Other designs of the cover 50 are also contemplated to be used with the present invention.

Therefore, during installation of the sun shade assembly 10 into the vehicle the motor spring housings 20 may be secured to each end of the roll tube 16 and the motor springs 46 may or may not be prewound as described above. Next, the motor spring housings 20 are arranged within a predetermined portion of the guide rails 22 and secured to the guide rails 22. Next, the entire guide rail assembly for the sun shade and sun roof will be fastened to the interior surface of the vehicle roof. After such fastening has occurred the pins will be pulled and the motor springs 46 will be set to their predetermined spring co-efficient which allows for smooth winding and unwinding of the shade 12 from the roll tube 16 within the sun shade assembly 10. However, it is also contemplated to have the guide rails 22 and associated electronics and mechanical gear installed into the roof and then have the motor spring assemblies 14 including the roll tube 16 and shade 12 arranged therebetween placed into the guide rails 22 by the assembler of the vehicle. Either method may be used depending on the design requirements and the manufacturing processes involved.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A motor spring assembly for use with a shade in a vehicle, said assembly comprising:

a motor spring housing;
a bracket integral with and extending from said housing;
a cover arranged over one side of said housing, said cover having a hollow cylindrical member extending from an outside surface thereof, said cover being generally cup shaped;
a motor spring arranged within said housing;
a shaft in contact with said motor spring, said shaft rotates with respect to said housing; and
a connector having a bore at a midpoint thereof, said connector arranged over an end of said shaft, a surface of said bore engages said shaft, said connector contacts said hollow cylindrical member, said connector having a raised member extending from an outer surface thereof, said raised member extends from an end of said connector in an axial direction a predetermined distance.

2. The assembly of claim 1 wherein said housing having at least one locking tab extending from an outer surface thereof.

3. The assembly of claim 1 wherein said housing having a generally circumferential pocket extending from a side thereof.

4. The assembly of claim 1 wherein said housing having a locking shoulder on an inside surface thereof, said shoulder engages with said motor spring.

5. The assembly of claim 2 wherein said cover having at least one locking finger, said locking finger engages with and interacts with said locking tab to secure said cover to said housing.

6. The assembly of claim 1 wherein said shaft is arranged through said cylindrical member.

7. The assembly of claim 6 wherein said cylindrical member having an orifice through a diameter thereof.

8. The assembly of claim 1 further comprising a plurality of arms integral with and arranged between said bracket and said housing.

9. The assembly of claim 1 wherein said bracket having an orifice arranged through a surface thereof.

10. The assembly of claim 1 wherein said shaft having an orifice through a diameter thereof.

11. The assembly of claim 1 wherein said shaft having a surface on an outer circumferential surface thereof, said surface contacts said connector to rotatably fix said shaft to said connector.

12. A sun shade assembly for use in a vehicle having a sun roof or window, said assembly comprising:

a pair of guide rails;
a shade extending between said guide rails;
a roller tube connected to one end of said shade, said roller tube having a slot at an end thereof;
a connector having a bore, said connector having a raised member extending from an outer surface thereof, said raised member is engaged with said slot to rotatably fix said connector within an end of said roller tube;
a shaft arranged within and rotatably fixed with respect to said connector, an outside surface of said shaft engaged with a surface of said bore; and
a motor spring assembly engaging said shaft, said motor spring assembly having a cover being generally cup shaped, said cover in contact with said connector, said motor spring assembly arranged within one of said guide rails.

13. The assembly of claim 12 wherein said motor spring assembly is arranged within another of said guide rails or other attachment means.

14. The assembly of claim 12 wherein said motor spring assembly having a housing and a bracket integral with said housing.

15. The assembly of claim 14 wherein said motor spring assembly having a plurality of arms integral with and extending between said housing and said bracket.

16. The assembly of claim 14 wherein said bracket is arranged within said guide rail.

17. The assembly of claim 16 wherein said bracket having an orifice therethrough, said orifice is used to secure said bracket to said guide rail.

18. The assembly of claim 14 wherein said housing having at least one locking tab extending from an outside surface thereof.

19. The assembly of claim 14 wherein said housing having a generally circumferential pocket extending from a side thereof, one end of said shaft is arranged within said pocket.

20. The assembly of claim 14 wherein said motor spring assembly having a motor spring arranged with said housing.

21. The assembly of claim 14 wherein said cover arranged over an open side of said housing.

22. The assembly of claim 21 wherein said cover having at least one locking finger.

23. A method of installing a sun shade assembly in a vehicle,
the sun shade assembly having a motor spring assembly comprising;
A motor spring assembly for use with a shade in a vehicle, said assembly comprising: a motor spring housing; a bracket integral with and extending from said housing; a cover arranged over one side of said housing, said cover having a hollow cylindrical member extending from an outside surface thereof, said cover being generally cup shaped; a motor spring arranged within said housing; a shaft in contact with said motor spring, said shaft rotates with respect to said housing; and a connector having a bore at a midpoint thereof, said connector arranged over an end of said shaft, a surface of said bore engages said shaft, said connector contacts said hollow cylindrical member, said connector having a raised member extending from an outer surface thereof, said raised member extends from an end of said connector in an axial direction a predetermined distance;
said method comprising the steps of: securing or attaching a pair of guide rails to an inside surface of the vehicle; connecting one of the motor spring assembly to each end of a roller tube, said roller tube having a shade arranged thereon; and arranging one of said motor spring assemblies housing within one of said guide rails and said other of said motor spring assembles housing within said other of said guide rails.

* * * * *